O. O. HULT.
BALANCING DEVICE FOR MOTORS.
APPLICATION FILED APR. 1, 1920.

1,387,720.

Patented Aug. 16, 1921.

Inventor
O. O. Hult,
By H. R. Kerslake
Attorney

O. O. HULT.
BALANCING DEVICE FOR MOTORS.
APPLICATION FILED APR. 1, 1920.
1,387,720.
Patented Aug. 16, 1921.
2 SHEETS—SHEET 2.
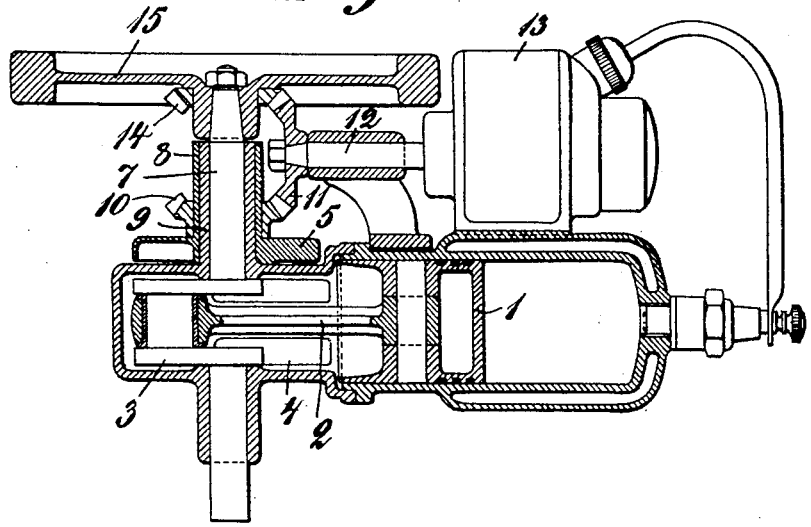
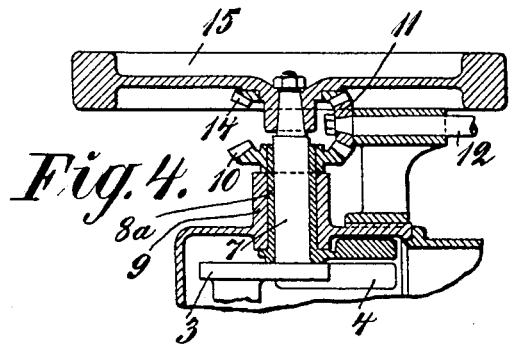
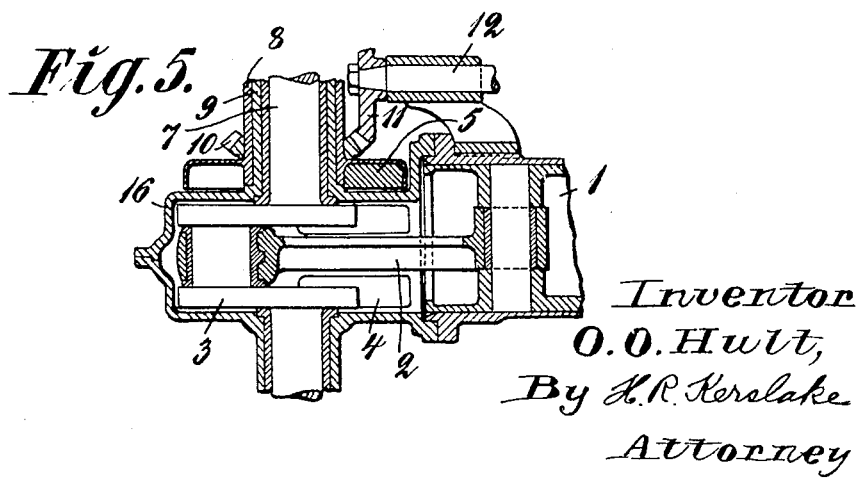
Inventor
O. O. Hult,
By H. R. Kerslake
Attorney

UNITED STATES PATENT OFFICE.

OSKAR OLOF HULT, OF STOCKHOLM, SWEDEN.

BALANCING DEVICE FOR MOTORS.

1,387,720. Specification of Letters Patent. Patented Aug. 16, 1921.

Application filed April 1, 1920. Serial No. 370,565.

*To all whom it may concern:*

Be it known that I, OSKAR OLOF HULT, a subject of the King of Sweden, and resident of 7 Styckjunkaregatan, Stockholm, in the Kingdom of Sweden, have invented certain new and useful Improvements in Balancing Devices for Motors, of which the following is a specification, reference being made to the accompanying drawings.

The object of the present invention is to provide a balancing device for single-cylinder (or other, in themselves unbalanced) motors. A balancing device in accordance with this invention is characterized essentially by the fact that the non-balance (perceptible among others by the vibration of the motor), which arises from the movement of the motor piston and the parts connected therewith, is wholly or partially compensated by a balance weight (or weights) which rotates around the motor shaft in an opposite direction to, and with the same angular velocity as, the latter. In motors in which magneto-electric ignition apparatus are used, the gearing by means of which the ignition apparatus is driven may also serve to drive the balance weight.

The invention is illustrated in the accompanying drawings, in which:—

Fig. 3 is a sectional view of the engine with my improvements applied and showing the ignition apparatus in plan.

Fig. 4 is a detail sectional view of a portion of a modified form of balancing mechanism.

Fig. 5 is a detail sectional view of a portion of a modified form of engine and a modification of the balancing mechanism.

Figure 1:
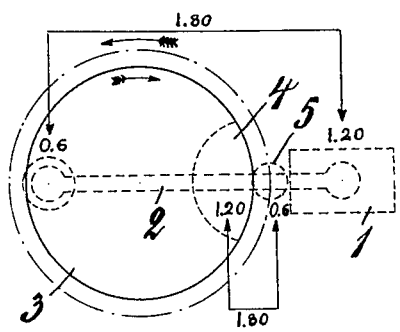
Figure 1 is a diagrammatic view of portions of an engine having my improvements applied thereto.
Figure 2:
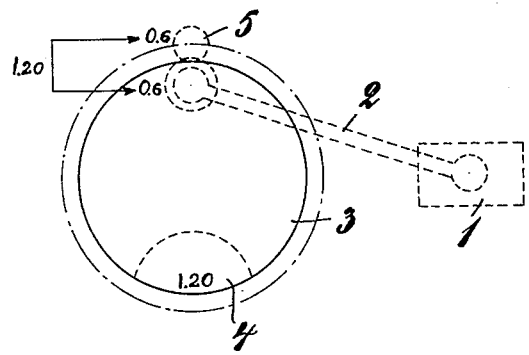
Fig. 2 is a similar view but showing the parts in a different position from that occupied in Fig. 1.

The invention should most easily be understood with the aid of the diagrams in Figs. 1 and 2. In these figures—as well as in the other figures—1 designates a motor piston, 2 its connecting rod, 3 its crank (crank disk), 4 a balance weight arranged on it, as is usual, and 5 another balance weight which is arranged in accordance with the present invention and which thus rotates in an opposite direction to the motor shaft and with the same angular velocity as the latter. With regard to the weight of these parts it is assumed that the piston 1 and the part of the connecting rod situated toward it weigh 1.20 kg., the crank 3 and the part of the connecting rod situated toward it 0.60 kg., the balance weight 4 1.20 kg., and the balance weight 5 0.60 kg.

At an examination of the diagrams in Figs. 1 and 2 corresponding to one another, in accordance with which the balance weight rotates around, or coaxially with, the motor shaft, it will be found (see Fig. 1) that when the piston turns in one of its extreme positions, the masses (the piston, the connecting rod and the crank) which then (i. e. immediately before the turn) move toward the left, are equal in weight (1.80 kg.) to the masses (the two balance weights) moving simultaneously to the right. Thus at this moment a balancing of the movable parts of the motor is attained. Obviously the same result is attained when the piston turns at its other extreme position. In practice, not merely the weights of the movable parts, but also their radii of rotation must evidently be so adjusted that this balancing—as well as the balancing referred to in the sequel—is attained (wholly or partially).

When the motor shaft has turned at an angle of ninety degrees from the position which corresponds to the extreme position of the piston, shown in Fig. 1, and the piston is thus approximately midway between its two extreme positions, whence the weight thereof and of the part of the connecting rod situated toward it can now be left out of account, the balance weight 5, owing to the fact that it rotates in an opposite direction to the motor shaft and with the same angular velocity as the latter, and also the crank pin which is acted upon by the part of the connecting rod situated toward the crank, are in a position diametrical to the position of the balance weight 4. Inasmuch as the diametrically situated weights turning at this moment are equal in weight (1.20 kg.), balancing of the motor is also now attained. Obviously the same is also the case when the motor shaft has turned at an angle of ninety degrees from the position which corresponds to the other extreme position of the piston.

The arrangements shown in Figs. 3, 4 and 5 are in accordance with the diagrams in Figs. 1 and 2, i. e. the balance weight 5 rotates around, or coaxially with, the motor shaft 7 in the opposite direction to, and with the same angular velocity as, the latter. In the arrangement shown in Fig. 3, the balance weight 5, the position of which corresponds to the position of the balance weight 5 in Fig. 1, is carried by a sleeve 8, which is rotatably mounted upon one of the bearings 9 of the motor shaft and carries a fixed bevel gear wheel 10, which engages another bevel gear wheel 11, mounted on the shaft 12 of a magneto-electric ignition apparatus 13 of the ordinary kind, placed on the motor cylinder. The toothed wheel 11 is in engagement with a third toothed wheel 14, mounted on the fly wheel 15 of the motor. As is evident, the balance weight 5, owing to this arrangement, will be caused to rotate in an opposite direction to, and with the same angular velocity as the motor shaft 7, or the balance weight 4 carried by the crank 3.

In the arrangement shown in Fig. 4 the balance weight 5 is likewise carried by a sleeve 8ª, which, however, directly embraces the motor shaft 7, for which the said sleeve thus serves as a bushing. The sleeve 8ª is surrounded by the one bearing 9 of the motor shaft. In other respects this arrangement is similar to the arrangement shown in Fig. 4.

With a view to as perfect a balancing of the motor as possible, it is expedient to place the balance weight arranged in accordance with the present invention so close to the center line of the motor as possible. This is the case in the arrangement shown in Fig. 5 (which in other respects agrees with the arrangement shown in Fig. 3). In order to facilitate this, the wall of the motor crank casing 16 to which the balance weight is adjacent, is situated farther in toward the axis of the cylinder of the motor than the opposite crank casing wall. In order to attain such a position of the first-named wall, i. e. in order to obtain the desired position of the balance weight 5, the crank of the motor is displaced (in a direction looking away from the said weight) in relation to the center line of the motor.

Balancing devices in accordance with the present invention, which can be applied to other, in themselves unbalanced motors than single-cylinder motors, may be of a different nature than what has been stated by way of example. Thus, for instance, instead of a balance weight 5 there may be two or more corresponding balance weights.

Having now described my invention, what I claim as new and desire to secure by Letters Patent is:

1. A balancing device for unbalanced motors including a balance weight mass which rotates with the motor shaft, and a balance weight mass which rotates in an opposite direction to and with the same angular velocity as the motor shaft, characterized in that the latter balance weight mass rotates around the same axis as the former one.

2. The combination with a motor provided with a shaft which is journaled at both sides of the crank portion of the shaft, of a balance weight mass rotatable with the motor shaft, and a balance weight mass rotatable in an opposite direction to and with the same angular velocity as the motor shaft, characterized in that the last mentioned balance weight mass rotates around the axis of the motor shaft.

3. A balancing device as defined in claim 1, characterized in that the balance weight mass adapted to rotate in opposite direction to the motor shaft is journaled in association with the motor shaft bearing, in which latter case the shaft sleeve of the said balance weight serves as a bushing for the motor shaft.

4. A balancing device as defined by claim 1 having a magneto electro ignition apparatus, gearing arranged between the motor shaft and the shaft of the ignition apparatus, one of the gears of said gearing driving the balance weight mass which rotates in a direction opposite to the motor shaft.

5. A balancing device as claimed in claim 1 characterized in that the balance weight mass rotating in opposite direction to the motor shaft is placed as close to the axis of the motor cylinder as possible.

6. A balancing device of the kind defined by claim 1 combined with the crank casing of the motor, said crank casing being so shaped that it permits of the second mentioned balance weight mass to be placed in close proximity to the axis of the cylinder of the motor.

7. A balancing device as claimed in claim 1 in which the balance weight mass first mentioned is displaced relatively to the axis of the cylinder of the motor.

8. The combination with a motor having a cylinder, a crank case, a piston mounted in the cylinder, a crank shaft mounted in the crank case, and a connecting rod between the piston and crank shaft, of a balancing device including a balance weight mass rotatable with and at the same velocity as the crank shaft, and a second balance weight mass rotatable around the axis of the crank shaft, and means for driving the second mentioned mass in a direction opposite to the direction of movement of the first mentioned mass.

In witness whereof I have hereunto set my hand in presence of two witnesses.

OSKAR OLOF HULT.

Witnesses:
H. B. OHLSSON,
L. MOLIN.